United States Patent
Chou

(10) Patent No.: US 9,777,181 B2
(45) Date of Patent: *Oct. 3, 2017

(54) ANTISTATIC ETHYLENE COPOLYMER COMPOSITIONS

(71) Applicant: E I DU PONT DE NEMOURS AND COMPANY, Wilmington, DE (US)

(72) Inventor: Richard T Chou, Hockessin, DE (US)

(73) Assignee: E. I. DU PONT DE NEMOURS AND COMPANY, Wilmington, DE (US)

( * ) Notice: Subject to any disclaimer, the term of this patent is extended or adjusted under 35 U.S.C. 154(b) by 356 days.

This patent is subject to a terminal disclaimer.

(21) Appl. No.: 14/575,247

(22) Filed: Dec. 18, 2014

(65) Prior Publication Data

US 2015/0179315 A1    Jun. 25, 2015

Related U.S. Application Data

(60) Provisional application No. 61/918,712, filed on Dec. 20, 2013.

(51) Int. Cl.

| | |
|---|---|
| *B32B 27/32* | (2006.01) |
| *B32B 27/30* | (2006.01) |
| *B32B 27/28* | (2006.01) |
| *B32B 27/06* | (2006.01) |
| *B32B 9/00* | (2006.01) |
| *B32B 27/34* | (2006.01) |
| *C08L 23/08* | (2006.01) |
| *C09D 123/08* | (2006.01) |

(52) U.S. Cl.
CPC .......... *C09D 123/0869* (2013.01); *B32B 9/00* (2013.01); *B32B 27/06* (2013.01); *B32B 27/28* (2013.01); *B32B 27/286* (2013.01); *B32B 27/30* (2013.01); *B32B 27/306* (2013.01); *B32B 27/308* (2013.01); *B32B 27/32* (2013.01); *B32B 27/34* (2013.01); *C08L 23/0869* (2013.01); *B32B 2307/00* (2013.01); *B32B 2307/21* (2013.01); *C08L 2201/04* (2013.01); *Y10T 428/3175* (2015.04); *Y10T 428/31721* (2015.04); *Y10T 428/31797* (2015.04); *Y10T 428/31935* (2015.04)

(58) Field of Classification Search
None
See application file for complete search history.

(56) References Cited

U.S. PATENT DOCUMENTS

| | | |
|---|---|---|
| 2,897,183 A | 7/1959 | Christl et al |
| 3,350,372 A | 10/1967 | Anspon et al |
| 3,756,996 A | 9/1973 | Pugh et al |
| 3,972,961 A | 8/1976 | Hammer et al. |
| RE30,754 E | 9/1981 | Hammer et al. |
| 4,351,931 A | 9/1982 | Armitage |
| 5,001,015 A | 3/1991 | Havens |
| 5,028,674 A | 7/1991 | Hatch et al. |
| 5,198,401 A | 3/1993 | Turner et al. |
| 5,405,922 A | 4/1995 | DeChellis et al. |
| 5,532,066 A | 7/1996 | Latiolais et al. |
| 9,441,100 B2 * | 9/2016 | Chou ............... C08L 23/0869 |
| 2003/0021945 A1 | 1/2003 | Kelch |
| 2005/0187315 A1 | 8/2005 | Dean |
| 2007/0142542 A1 | 6/2007 | Morris et al. |

FOREIGN PATENT DOCUMENTS

| | | |
|---|---|---|
| JP | 59-115591 A | 4/1984 |
| JP | 61-44646 A | 3/1986 |
| JP | 10-193495 A | 7/1998 |
| WO | 02/102898 A1 | 12/2002 |
| WO | 2004/050362 A1 | 6/2004 |

OTHER PUBLICATIONS

Chou et al, High Flexibility EMA Made from High Pressure Tubular Process, Annual Technical Conference—Society of Plastics Engineers (2002), 60th (vol. 2), 1832-1836.

* cited by examiner

*Primary Examiner* — Sheeba Ahmed

(57) ABSTRACT

Disclosed is an antistatic composition comprising a base resin comprising polyethylene or ethylene copolymers, an ethylene copolymer comprising amine-reactive sites and a polyetheramine and articles thereof. The ethylene copolymer comprising amine-reactive sites and the polyetheramine react to provide a graft copolymer.

20 Claims, No Drawings

US 9,777,181 B2

ANTISTATIC ETHYLENE COPOLYMER COMPOSITIONS

CROSS REFERENCE TO RELATED APPLICATION

This application claims priority under 35 U.S.C. §119(e) from U.S. Provisional Patent Application No. 61/918,712, filed Dec. 20, 2013, hereby incorporated herein by reference in its entirety.

FIELD OF THE INVENTION

This invention relates to an antistatic polymer composition.

BACKGROUND AND RELATED ART

Generally, a fabricated article made from a polymeric material can become statically charged, and the surface can attract and hold charged particles such as dust in the air. In some cases an article can become damaged and/or otherwise devalued by the adhesion of electrostatically charged species.

Accordingly, antistatic properties may be important for many applications for preventing adhesion of charged particles. Except for polymers of inherently high polarity, most organic polymeric materials lack adequate antistatic resistance especially at low humidity. This is especially true for polyolefin materials, such as polypropylene, polyethylene, and ethylene copolymers, etc.

Many attempts have been made to address this issue from aspects of performance, cost, and ease of conversion to final products. Antistatic agents can be incorporated into the composition of a molded article or an antistatic agent can be applied to the surface of an article as a way of preventing build-up of static charge on an article. Use of antistatic agents is not trouble-free.

A common approach to enhancing the antistatic properties of thermoplastics is to introduce low-molecular weight antistatic agents into the polymeric material by compounding prior to or during the manufacturing of articles, e.g., by means of molding or film-forming processes. Antistatic agents work by migrating to the external polymer surface of the manufactured articles because of their high volatility and poor compatibility with polymer composition. They form a continuous film on the surface of the polymers. Therefore, the incorporation of a low-molecular weight antistatic agent for achieving anti-static is not trouble free. Materials that come in contact with the composition can become contaminated due to bleeding of the antistatic agent out of the composition and/or the antistatic agent effect can be deteriorated with time.

An applied antistatic film can have inadequate mechanical properties and could be easily damaged, or have poor water resistance, or become tacky due to absorption of water.

Another commonly practiced approach is to add permanent, non-diffusing antistatic agents based on polymers with high antistatic properties. For example, block copolymers based on polyether-block-amide (commercially supplied by Atochem under the PEBAX® tradename) may be used as permanent antistatic agents by compounding with an isolative polymer to lower the surface resistivity.

While polyether-block-amides may perform well in certain polymer systems, they do not perform well with polyolefin systems. Due to their poor compatibility with polyolefin materials, a third polymer serving as a compatibilizer may have to be added to insure the antistatic function of the polyolefin matrix. This may confine the composition to be processed in a narrow processing window for attaining the antistatic performance. Polyetheramide block copolymers do not have suitable direct adhesion to other substrates, especially polyolefin substrates. Their high cost is another issue for their use as permanent antistatic agents.

U.S. Pat. No. 5,001,015 discloses polyolefin films with antistatic properties which include as possible antistatic agents the reaction products of polyalkoxylates with fatty alcohols.

Potassium-neutralized ionomer compositions have been developed to act as permanent antistatic agents in blending with polyolefins (see e.g. PCT Patent Application publication WO2004-050362). K-ionomer compositions may function well as permanent antistatic agents, but they are difficult to produce and handle in initial manufacture and when converting into final products. See also US Patent Application Publication 2007/0142542.

Subsurface antistatic polymer layers can be used to avoid problems encountered with exposing an antistatic layer at the surface of an article. JP 2-28919B discloses an antistatic plastic film in which an ionic conductive resin layer is formed on a plastic film and a waterproof plastic layer having a volume resistivity of $1 \times 10^{13}$ Ω·cm or less and having a thickness of 10 μm or less is formed on the surface of the ionic conductive resin layer.

JP 61-44646A discloses a charged stain-resistant laminate having an alkali metal salt or amine salt of an ethylene-unsaturated carboxylic acid copolymer as an intermediate layer. JP 10-193495A discloses a dustproof laminate having a composition comprising a thermoplastic resin consisting of a potassium ionomer of an ethylene-unsaturated carboxylic acid and a polyhydroxy compound as an intermediate layer.

Overall, a satisfactory solution for polyolefin-based materials with adequate anti-static performance has not been achieved.

SUMMARY OF THE INVENTION

This invention relates to a composition comprising, consisting essentially of, or prepared from:

(a) A base resin present in an amount of about 20 to about 90 parts by weight of the combination of (a), (b) and (c), comprising or consisting essentially of i. 31 to 100 weight % based on the combination of i. and ii.; of polyethylene homopolymers, polyethylene copolymers, polypropylene homopolymers or polypropylene copolymers; and ii. 0 to 69 weight %, based on the combination of i. and ii., of at least one ethylene copolymer, wherein the copolymer comprising copolymerized units of ethylene and copolymerized units of a polar comonomer selected from vinyl acetate, alkyl methacrylate, alkyl acrylate, carbon monoxide or mixtures thereof, wherein said polar comonomer is present in the copolymer in an amount from about 6 to about 40 weight %;

(b) a copolymer comprising copolymerized units of ethylene and copolymerized units of a comonomer providing an amine-reactive site comprising an anhydride group, a vicinal pair of carboxylic groups or a carboxylic group adjacent to an alkoxycarbonyl group, wherein the alkoxy group contains up to 20 carbon atoms, and optionally copolymerized units of a third comonomer, wherein the amine-reactive site is present in the copolymer in an amount of from 3 to 25 weight %, in an amount of about 10 to about 80 parts by weight of the combination of (a), (b) and (c); and (c) a short chain polymer having from about 5 to 50 repeat units and containing one primary amine active amine site, the remainder of the side chain polymer being substantially unreactive with the amine-reactive sites of the copolymer of (b) and comprising propylene oxide, ethylene oxide, or mixture thereof, in an amount of about 3 to about 30 parts by weight of the combination of (a), (b) and (c).

In a particular aspect the composition comprises a blend of (a) and (d) an ethylene graft copolymer comprising polyetherimide segments, wherein the ethylene graft copolymer comprises, consists essentially of, or is produced from, a trunk copolymer comprising copolymerized units of ethylene, copolymerized units of a comonomer providing an amine-reactive site comprising an anhydride group, a vicinal pair of carboxylic groups or a carboxylic group adjacent to an alkoxycarbonyl group, wherein the alkoxy group contains up to 20 carbon atoms, and optionally copolymerized units of a third comonomer; and at least one type side chain polymer linked to said reactive sites through imide linkages, said side chain polymer being derived from a short chain polymer having from about 5 to 50 repeat units and containing one primary amine active amine site, the remainder of the side chain polymer being substantially unreactive with the amine-reactive sites of the trunk copolymer and comprising propylene oxide, ethylene oxide, or mixture thereof.

The invention also provides a process for preparing the blend described above, comprising
(1) providing a base polymer comprising;
  i. 31 to 100 weight % based on the combination of i and ii; of polyethylene homopolymers, polyethylene copolymers, polypropylene homopolymers or polypropylene copolymers; and
  ii. 0 to 69 weight %, based on the combination of i and ii, of at least one ethylene copolymer, wherein the copolymer comprising copolymerized units of ethylene and copolymerized units of a polar comonomer selected from vinyl acetate, alkyl methacrylate, alkyl acrylate, carbon monoxide or mixtures thereof, wherein said polar comonomer is present in the copolymer in an amount from about 6 to about 40 weight %;
(2) providing a trunk copolymer comprising copolymerized units of ethylene, copolymerized units of a comonomer providing an amine-reactive site selected from the group consisting of an anhydride group, a vicinal pair of carboxylic groups and a carboxylic group adjacent to an alkoxycarbonyl group, wherein the alkoxy group contains up to 20 carbon atoms, and optionally copolymerized units of a third comonomer;
(3) providing a short chain polymer having from about 5 to 50 repeat units and containing one primary amine active amine site, the remainder of the short chain polymer being substantially unreactive with the amine-reactive sites of the trunk copolymer and comprising polyethylene oxide;
(4) heating and mixing for about 15 seconds to about 60 minutes the base polymer, the trunk polymer and the short chain polymer, to provide a blend of the base polymer and an ethylene graft copolymer comprising polyetherimide segments.

The invention also provides an article of manufacture, film or powder comprising the composition described above.

The invention also provides a multilayer film structure comprising at least one layer comprising the composition described above and at least one additional layer.

The invention further provides articles of manufacture comprising the film and multilayer structures described above.

DETAILED DESCRIPTION OF THE INVENTION

All publications, patent applications, patents, and other references mentioned herein are incorporated by reference in their entirety. Unless otherwise defined, all technical and scientific terms used herein have the same meaning as commonly understood by one of ordinary skill in the art to which this invention belongs. In case of conflict, the present specification, including definitions, will control.

Unless stated otherwise, all percentages, parts, ratios, etc., are by weight. Further, when an amount, concentration, or other value or parameter is given as either a range, preferred range or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range. When a component is indicated as present in a range starting from 0, such component is an optional component (i.e., it may or may not be present). When present an optional component may be at least 0.1 weight % of the composition or copolymer.

When the term "about" is used in describing a value or an end-point of a range, the disclosure should be understood to include the specific value or end-point referred to.

Use of "a" or "an" are employed to describe elements and components of the invention. This is done merely for convenience and to give a general sense of the invention. This description should be read to include one or at least one and the singular also includes the plural unless it is obvious that it is meant otherwise.

The term "consisting essentially of" in relation to compositions is to indicate that substantially (greater than 95 weight % or greater than 99 weight %) the only polymer(s) present in a component layer is the polymer(s) recited. Thus this term does not exclude the presence of additives, e.g. conventional film additives; i.e. each layer independently may contain conventional film additives such those described below. Moreover, such additives may possibly be added via a masterbatch that may include other polymers as carriers, so that minor amounts (less than 5 or less than 1 weight %) of polymers other than those recited may be present, wherein these minor amounts do not change the basic and novel characteristics of the invention.

As used herein, the term "copolymers" can describe polymers obtained by copolymerization of at least two different monomer species. The term "terpolymer" can be used to specifically describe a copolymer that is obtained from copolymerization of three different monomer species.

In one embodiment, this invention is an article that comprises a composition that has antistatic properties. Articles such as blown films prepared from blends of polyolefin and graft copolymers comprising an ethylene and a dicarboxylic monomer grafted with polyetheramine exhibit antistatic properties that correlate to the amount of polyetheramine content. The blends showed excellent temperature resistance as reflected from high melting point and high heat of fusion above 90° C. and also showed the capability to be sealed by HF welding. The blends are soft and highly flexible with excellent mechanical properties.

The antistatic composition comprises a base resin that includes polyethylene homopolymers, polyethylene copolymers, polypropylene homopolymers or polypropylene copolymers. Including polyolefins such as polyethylene and/or polypropylene may provide balanced properties such as including polyethylene or polypropylene may provide lower cost and/or improved adhesion to low polarity materials without significantly reducing the antistatic properties of the blend. Inclusion of polypropylene may also provide for higher usage temperatures.

"Polyethylene" includes low density polyethylene, linear low density polyethylene, high density polyethylene or metallocene polyethylene. An ethylene-based polymer suitable as a polymeric material that can be used as the surface layer can be an ethylene homopolymer or a copolymer of ethylene and α-olefin having three or more (preferably from 3 to 12) carbon atoms that is manufactured in the presence of a metallocene catalyst (see for example U.S. Pat. Nos. 5,198,401 and 5,405,922).

Examples of the α-olefin having three or more carbon atoms in the aforementioned ethylene copolymer include propylene, 1-butene, 1-pentene, 1-hexene, 1-octene, 1-decene, 1-dodecene, 4-methyl-1-pentene, etc. In particular, a copolymer of ethylene and an α-olefin having from 3 to 12 carbon atoms is preferably used. In some cases, more than one α-olefin may be present in a mixture that can be copolymerized with ethylene.

As the polymer or copolymer of ethylene manufactured in the presence of a metallocene catalyst, those with various densities may be employed depending upon the α-olefin content in the copolymer. In general, however, it is preferable to use an ethylene copolymer having a density of from about 870 to about 970 kg/m$^3$, particularly from about 890 to about 950 kg/m$^3$, and especially from about 900 to about 940 kg/m$^3$. When processability and practical physical properties are taken into consideration, preferred is the use of a polymer having a melt flow rate, measured at 190° C. and 2160 g load, of from about 0.1 to about 100 g/10 minutes, preferably from about 0.2 to about 50 g/10 minutes.

Polar Ethylene Copolymers

Compositions of this invention comprise a first component (a) that may optionally include at least one copolymer obtained from copolymerization of ethylene with a polar monomer (that is, a polar ethylene copolymer). Inclusion of polar ethylene copolymers may provide improved antistatic performance and improve adhesion to polar materials. The optional polymer(s) can be present in amounts up to about 69 weight % of the base resin of (a), so long as they do not detract from the basic and novel characteristics of the composition and do not significantly adversely affect the desirable performance characteristics, such as high temperature resistance, adhesive properties or optical clarity of the composition.

Preferably, the optional copolymer of (a) comprises ethylene/vinyl acetate copolymers, ethylene/alkyl (meth)acrylate copolymers and ethylene/(meth)acrylate/carbon monoxide terpolymers and/or mixtures of any of these. Ethylene (meth)acrylate copolymers include ethylene acrylic ester copolymers and ethylene methacrylic ester copolymers.

Combinations of two or more different polar ethylene copolymers may be suitable. For example, combinations of two or more polar ethylene copolymers with different polar comonomers can be suitable, as can be combinations of two or more polar ethylene copolymers having identical monomers but with different amounts of said monomers.

Ethylene/Vinyl Acetate Copolymers

A composition of this invention can comprise at least one ethylene/vinyl acetate copolymer (an EVA copolymer), or blends thereof.

The weight percentage of vinyl acetate monomer incorporated into an EVA copolymer suitable for use herein can vary from about 2 weight percent up to about 45 weight percent or greater, based on the total weight of the copolymer. The amount of vinyl acetate can be varied to obtain a desirable degree of polarity sought for the blended composition.

The ethylene/vinyl acetate copolymer preferably has a vinyl acetate unit content of from about 6 to about 40% by weight, or from a lower limit of about 6, about 12, or about 15 weight % to an upper limit of about 20, or about 30 or about 40 weight %. The ethylene/vinyl acetate copolymer may optionally be modified by methods well known in the art, including modification with an unsaturated carboxylic acid or its derivatives, such as maleic anhydride or maleic acid. The ethylene/vinyl acetate copolymer preferably has a melt index, measured in accordance with ASTM D 1238 at 190° C., of from about 1 to about 800 g/10 minutes or from about 1 to about 400 g/10 minutes, more preferably from about 1 to about 100 g/10 minutes.

Ethylene/vinyl acetate copolymers suitable for use in this invention include those available from E. I. du Pont de Nemours & Co. (DuPont), Wilmington, Del. under the Elvax® tradename.

A mixture of two or more different ethylene/vinyl acetate copolymers can be used in the compositions for this invention in place of a single copolymer as long as the average values for the comonomer content will be within the range indicated above. Particularly useful properties may be obtained when two or more properly selected ethylene/vinyl acetate copolymers are used in blends of this invention.

Ethylene/Alkyl Acrylate Copolymers

As used herein, ethylene/alkyl (meth)acrylate copolymers include copolymers of ethylene and alkyl acrylates or alkyl methacrylates wherein the alkyl moiety contains from one to 20, preferably one to six carbon atoms. Examples of alkyl acrylates include methyl acrylate, ethyl acrylate and butyl acrylate and examples of alkyl methacrylates include methyl methacrylate, ethyl methacrylate and butyl methacrylate. "Ethylene/methyl acrylate" (EMA) means a copolymer of ethylene and methyl acrylate. "Ethylene/ethyl acrylate" (EEA) means a copolymer of ethylene and ethyl acrylate. "Ethylene/butyl acrylate" (EBA) means a copolymer of ethylene and butylacrylate. Of note are ethylene/butyl acrylate copolymers prepared from i-butyl acrylate comonomers (EiBA) and ethylene/butyl acrylate copolymers prepared from n-butyl acrylate comonomers (EnBA).

The relative amount of the alkyl (meth)acrylate comonomer incorporated into ethylene/alkyl (meth)acrylate copolymer can, in principle, vary broadly from a few weight percent up to as high as 40 weight percent of the total copolymer or even higher, such as from about 6 to about 40% by weight, or from a lower limit of about 6, about 12, or about 15 weight % to an upper limit of about 20, or about 30 or about 40 weight %. Similarly, the alkyl group can comprise from 1-carbon to 6-carbon groups, that is to say the alkyl group can vary from a methyl group up to and inclusive of branched and/or unbranched propyl, butyl, pentyl, and hexyl groups. The relative amount and choice of the alkyl group present in the alkyl (meth)acrylate ester comonomer can be used to manipulate the polarity of the composition. Preferably, the alkyl group in the alkyl (meth) acrylate comonomer has from one to four carbon atoms.

The ethylene/alkyl (meth)acrylate copolymer preferably has a melt index, measured in accordance with ASTM D 1238 at 190° C., of from about 1 to about 800 g/10 minutes or from about 1 to about 400 g/10 minutes, more preferably from about 1 to about 100 g/10 minutes. Of note is an ethylene/methyl acrylate copolymer comprising 20 weight % methyl acrylate with an MI of 8 g/10 min.

Ethylene/alkyl (meth)acrylate copolymers can be prepared by processes well known in the polymer art using either autoclave or tubular reactors. The copolymerization can be run as a continuous process in a stirred high-temperature and high-pressure autoclave reactor. For example, ethylene, the alkyl acrylate, and optionally a solvent such as methanol (U.S. Pat. No. 5,028,674) are fed continuously into a stirred autoclave such as the type disclosed in U.S. Pat. No. 2,897,183, together with an initiator.

Preferably, the ethylene copolymer is of the type that is prepared in a high pressure, tubular reactor according to the procedure described in the article "High Flexibility EMA Made from High Pressure Tubular Process" (Annual Technical Conference—Society of Plastics Engineers (2002), 60th (Vol. 2), 1832-1836). The ethylene copolymer is obtained in a tubular reactor at elevated temperature with additional introduction of reactant comonomer along the tube. However, it should be appreciated that similar ethylene/alkyl acrylate copolymeric material can be produced in a series of autoclave reactors wherein comonomer replacement is achieved by multiple zone introduction of reactant comonomer as taught in U.S. Pat. Nos. 3,350,372; 3,756,996; and 5,532,066, and as such these high melting point materials should be considered equivalent for purposes of this invention.

Ethylene/alkyl acrylate copolymers suitable for use in this invention include those available from DuPont under the Elvaloy® AC tradename.

Mixtures of two or more ethylene/alkyl (meth)acrylate copolymers are contemplated as within the scope of this invention.

The compositions of this invention also comprise a second polar copolymer different from the optional copolymer of ethylene and polar comonomers of (a). Notably, the second polar copolymer contains a comononer that provides an amine-reactive site selected from the group consisting of an anhydride group, a vicinal pair of carboxylic groups and a carboxylic group adjacent to an alkoxycarbonyl group that is not present in the first polar copolymer. This copolymer is obtained by copolymerization of at least ethylene and at least one comonomer capable of copolymerizing with ethylene such as an anhydride or a functional equivalent thereof, such as a vicinal pair of carboxylic groups or a carboxylic group adjacent to an alkoxycarbonyl group, wherein the alkoxy group contains up to 20 carbon atoms and the comonomer provides an amine-reactive site in the copolymer. The comonomer includes $C_4$-$C_8$ unsaturated anhydrides, $C_4$-$C_8$ unsaturated acids having at least two carboxylic groups, monoesters or diesters of $C_4$-$C_8$ unsaturated acids having at least two carboxylic groups, and mixtures thereof.

Examples of suitable comonomers include unsaturated anhydrides such as maleic anhydride, and itaconic anhydride; 1,4-butenedioic acids (e.g. maleic acid, fumaric acid, itaconic acid and citraconic acid); and $C_1$-$C_{20}$ alkyl monoesters of the 1,4-butenedioc acids, including methyl hydrogen maleate, ethyl hydrogen maleate, propyl hydrogen fumarate, and 2-ethylhexyl hydrogen fumarate. Of these, maleic anhydride, ethyl hydrogen maleate and methyl hydrogen maleate are preferred. Maleic anhydride, ethyl hydrogen maleate (EHM), or a mixture of the two are most preferred.

Preferred are copolymers of ethylene and monoalkyl maleates (also known as alkyl hydrogen maleates). As used herein, the term "ethylene/monoalkyl maleate copolymers" refers to such copolymers prepared from ethylene and a maleic acid monoester (sometimes referred to as a "half-ester, wherein one carboxyl group of the maleic moiety is esterified and the other is an unesterified carboxylic acid).

Terpolymers or tetrapolymers comprise comonomers in addition to the ethylene and amine-reactive comonomer. Preferably, the additional comonomers are less reactive to amines than the amine-reactive site comonomer. The copolymers include E/X/Y terpolymers, wherein E is ethylene; X is a monomer selected from the group consisting of vinyl acetate, and alkyl (meth)acrylates; and Y is a maleic acid monoester, including maleic monoesters of $C_1$ to $C_4$ alcohols, such as for example, methyl, ethyl, n-propyl, isopropyl, and n-butyl alcohols, wherein X is less than 15 weight %, and preferably less than 5 weight % of the terpolymer. Examples of monomers suitable for inclusion as component X are (meth)acrylic acid esters of $C_1$ to $C_4$ alcohols. For example, suitable acrylate esters include methyl acrylate and butyl acrylate and suitable alkyl methacrylate esters include methyl methacrylate and n-butyl methacrylate. Preferably, when the copolymer is a higher order polymer such as a terpolymer, the combined comonomers other than ethylene are present in about 6 to about 30 weight % of the copolymer. For such copolymers, the alcohol moiety used in the maleic acid monoester comonomer may be the same as that used in the alkyl (meth)acrylate comonomer, or it may be different.

Specific examples of the copolymer include ethylene/maleic acid monoester dipolymers such as ethylene/ethyl hydrogen maleate dipolymer, ethylene/maleic acid monoester/methyl acrylate terpolymers, ethylene/maleic acid monoester/methyl methacrylate terpolymers, ethylene/maleic acid monoester/ethyl acrylate terpolymers, ethylene/maleic acid monoester/ethyl methacrylate terpolymers, ethylene/maleic acid monoester/n-butyl acrylate terpolymers and ethylene/maleic acid monoester/n-butyl methacrylate terpolymers.

Of particular note are ethylene/alkyl hydrogen maleate copolymers wherein the alkyl group is ethyl.

The copolymer may comprise about 6 to about 25 weight % copolymerized units of the amine-reactive comonomer, based on the weight of the copolymer. Alternatively, the level of copolymerized units of the amine-reactive comonomer (for example ethyl hydrogen maleate) is from a lower limit of about 6, 8 or about 10 weight % to an upper limit of about 18, about 20, or about 25 weight based on the total weight of the copolymer.

The copolymer may have a melt index from about 5 to about 400 g/10 min., preferably about 5 or about 10 to about 100 g/min. A representative copolymer is a random copolymer having a melt index of about 5 to 100 grams/10 minutes and consisting essentially of copolymerized ethylene and a monoalkyl ester of a 1,4-butenedioic acid in which the alkyl group of the ester has 1 to 4 carbon atoms. Preferably, the trunk copolymer is a dipolymer of ethylene and about 4 to about 25 weight %, or more preferably about 8 to about 20 weight %) of ethyl hydrogen maleate (an "EMAME" copolymer). A specific polymer may comprise from about 8 to about 10 weight % of ethyl hydrogen maleate. Another specific copolymer comprises about 15 weight % of ethyl hydrogen maleate. Such copolymers are commercially available from DuPont under the tradename Fusabond®.

Ethylene/ethyl hydrogen maleate/alkyl ester terpolymers are also known. For example, a terpolymer of 46.4% ethylene, 50% methyl acylate and 3.6% of monoethyl maleate is described in U.S. Pat. No. 3,972,961. Preferably, the amount of MAME in the copolymer is from about 6 to about 20 weight % and the amount of additional comonomer (vinyl acetate, alkyl acrylate or alkyl methacrylate is less than or equal to 15 or less than or equal to 6 weight % of the terpolymer.

Preferably the EMAME copolymer or the EMAME terpolymer has a melting point higher than 80° C.

These copolymers may be synthesized by random copolymerization of ethylene and the particular comonomer(s) in a high-pressure free radical process, generally an autoclave process. For example, ethylene/monoalkyl maleate copolymers can be obtained using a suitable high-pressure process described, for example, in U.S. Pat. No. 4,351,931, the teachings therein incorporated herein by reference. Some examples of this type of ethylene/ester copolymer are described in U.S. Patent Application Publication 2005/0187315.

Short Chain Polymers

The composition also comprises short chain polymers or oligomers having about 5 to 50 repeat units with one reactive end group comprising a primary amine, and the other end and/or substituent groups are substantially unreactive. Polyetheramines suitable for use as the short chain oligomer or polymer contain primary amino groups at the end of a polyether backbone. Examples of short chain polymers include polymers of organic oxides containing 2 to 16 carbon atoms, e.g., ethylene oxide, propylene oxide, 1,2-butylene epoxide, 1,4-butylene epoxide, styrene oxide, 1,2-diphenyl ethylene oxide, dioxolane, and copolymers of said organic oxides containing 2 to 16 carbon atoms, with a primary amine at one end. The average molecular weight ($M_W$) of the polyetheramine is in the range of 300 to 5000, preferably 500 to 3000.

Polyetheramines based on propylene oxide, ethylene oxide, or a mixture of both, are available commercially from Huntsman Chemical under the tradename Jeffamine®. Examples include Jeffamine® M-600 ($M_W$ approximately 600, 9/1 PO/EO ratio), Jeffamine® M-1000 ($M_W$ approximately 1000, 3/19 PO/EO ratio), Jeffamine M-2005 ($M_W$ approximately 2000, 29/6 PO/EO ratio) and Jeffamine M-2070 ($M_W$ approximately 2000, 10/31 PO/EO ratio).

The base resin polymer(s), the copolymer with amine-reactive sites and the short chain copolymer can be combined as a physical blend such as a salt and pepper pellet blend for further thermoplastic processing.

The short chain polymers can be linked to the amine-reactive sites of the copolymer of (b) to provide thermoplastic graft copolymers via the amine end as described in greater detail below.

Thermoplastic graft copolymers described herein are prepared by treating a trunk copolymer having amine-reactive sites with at least one side chain polymer having about one active primary amine site; the other groups or ends of the side chain polymer are substantially unreactive with the reactive sites on the trunk copolymer. In the final graft copolymer the trunk copolymer content ranges in an amount of about 25 to 95 percent by weight and the side chain polymer content ranges from about 5 to 75 percent by weight. The trunk copolymers contain, on a number average, about 300 to 50,000, preferably 500 to 20,000, chain atoms, and a number of amine reactive sites occurring, on the average, at a frequency of about one to 200 per 1000 chain atoms of the trunk copolymer. On the average there will be at least one active site per trunk copolymer chain. The side chain polymer will, in general, be shorter than the trunk copolymer, ranging in length from about 25 to 1,000 chain atoms, preferably about 30 to 300 chain atoms.

The trunk copolymers must be sufficiently stable to withstand heating during subsequent grafting of the side chain polymer. They should also be free from hydroxyl, primary amino, and secondary amino groups that can react with the amine-reactive sites to form thermostable crosslinks, which would cause a loss of the desired thermoplasticity.

The thermoplastic graft copolymer consists essentially of a trunk copolymer and a side chain polymer or oligomer wherein the trunk copolymer and the side chain polymer are preferably linked through imide linkages. The vicinal carboxylic acid groups allow formation of an imide when treated with the primary amine of the side chain polymer. When the trunk polymer is a terpolymer with an additional comonomer such as an alkyl acrylate or methacrylate, the primary amine of the side chain polymer may, depending on reaction conditions, alternatively/additionally react with the ester to provide an amide linkage.

The graft copolymers can be prepared in various ways. Convenient ways include (1) the anhydride route, for use with ethylene/maleic anhydride and other anhydride-containing trunk copolymers, and (2) the vicinal acid-acid or acid-ester route, for use with trunk copolymers having diacid or monoester of vicinal dicarboxylic acid substituents, respectively.

The anhydride route involves simply heating together with mixing the trunk copolymer having carboxylic anhydride groups, preferably maleic anhydride, and the amino-containing side chain polymer in the molten state, at a temperature from 75 to 250° C., such as about 225° C., or in solution at a temperature of 75 to 100° C. or higher. The heating temperature is above the melting point of the trunk copolymer and the amino polymer. The time of reaction, which is dependent upon the temperature and rate of mixing, can vary from about 15 seconds to 60 minutes in the melt, preferably 1 to 10 minutes. Reaction in the melt, an especially preferred procedure, can conveniently be carried out on a roll mill, in a melt extruder, or in internal mixers having convoluted rollers, sigma blades, etc., using a temperature that will give short reaction time and as many passes as necessary to insure complete reaction. Completeness of reaction can be judged by the appearance of the product, good clarity in the melt indicating essentially complete reaction. With a roll mill as the reactor, the trunk copolymer and side-chain polymer can be premixed or mixed during reaction on the mill; and because of the exposure it may be desirable to include stabilizing agents such as inhibitors or antioxidants, or to carry out the operation in a protective atmosphere such as nitrogen. With an extruder as the reactor, premixing as a dry blend is desirable.

The vicinal acid-ester route can also be carried out in the melt for reaction times similar to, but generally slower than, those for the anhydride route described above. The vicinal acid-ester route may be conducted in the same way as that described above for the anhydride route, carried out on a roll mill or in an extruder. Reaction between the polyetheramine and an EMAME copolymer proceeds well to high conversion, if the polar polyetheramine is effectively mixed with the non-polar EMAME for reaction.

The graft copolymer is believed to be obtained by attachment of the amine side chain to the backbone copolymer through imide linkages (with elimination of alcohol) which may be derived through intermediate formation of amic acids, or by prior conversion of the vicinal acid-ester by loss of alcohol to an anhydride and reaction of the latter with the amino oligomer as described above. The graft copolymer product can be characterized by several techniques, which show the presence of imide-linked side chains, the degree of polymerization of the side chains, and the chemical identity of the side chains, to name a few. Certain physical characteristics often are also helpful to show that a graft copolymer has been obtained.

Additional details of the reactions linking the trunk copolymer and the side chain polymer and means of characterizing the graft copolymer may be found in U.S. Pat. No. 3,972,961 and RE 30,754.

The process allows for control of the type and length of the polymer side chain grafted onto the trunk copolymer. From the specific type of trunk copolymer the average frequency of possible reactive graft sites can be readily determined by the fraction, e.g., on a molar basis, of monomer molecules providing the reactive sites which are polymerized into the trunk copolymer. Since the polymeric side chains are preformed prior to reacting with reactive sites on the trunk copolymer excellent control of the graft copolymer is achieved. The resultant thermoplastic graft copolymer is relatively uncontaminated with ungrafted side chain polymer, which may be a major problem in conventional free radical graft polymerization.

Incorporation of up to 20 weight % of Jeffamine M-600 or 35 weight % of Jeffamine M-1000 into an EMAME copolymer may be possible. The amount of possible polyetheramine incorporation increases for an EMAME copolymer with higher MAME content. An average of at least about three polyether segments grafted onto each EMAME polymer backbone is preferable.

Notably, the ethylene graft copolymer has a ratio of the mole % of polyetheramine added divided by the mole % of the comonomer providing an amine-reactive site in the starting trunk copolymer of about 0.1 to about 0.9, or from about 0.2 to about 0.8, or from about 0.3 to about 0.7.

The graft copolymer based on the reaction of EMAME and polyetheramine may have the ratio of the weight of polyetheramine added divided by the molecular weight of the polyetheramine versus the weight % of MAME in the starting EMAME copolymer divided by 144 of about 0.1 to about 0.9. For example, for 100 grams of EMAME (10 weight % of MAME), polyetheramine with a MW of 1000 would be incorporated into the polymer in the range of 6.9 grams to 62.5 grams. A preferred range is 0.2 to 0.8.

The advantage of this process in providing control of the side chain polymers is illustrated as follows. To provide improved properties at elevated temperatures, it may be desirable to have the side chain polymers of sufficient length so that these side chains can crystallize. For another use, it may be important that the side chain is not long enough to provide a substantial amount of crystallization at room temperature. With polyethylene oxide side chains, good antistatic behavior may be obtained when the chains are mobile, i.e., non-crystalline. When the side chains contain more than about 80 chain atoms, the side chains may crystallize at room temperature and lose their good antistatic behavior.

The graft copolymer can be prepared and then blended with the base resin by standard blending procedures. Blending in the melt can conveniently be carried out on a roll mill, in a melt extruder, or in internal mixers having convoluted rollers, sigma blades, etc.

Alternatively, the grafting of the side chain polymer to the trunk polymer and the blending with the base resin can be conducted in a single operation, provided the base resin does not react with the side chain polymer. Notably, the method comprises (1) providing a base resin as described above; (2) providing a trunk copolymer as described above; (3) providing a short chain polymer as described above; and (4) heating and mixing for about 15 seconds to 60 minutes the base polymer, the trunk polymer and the short chain polymer, to provide a blend of the base polymer and an ethylene graft copolymer comprising polyetherimide segments.

The blending and grafting may be conducted using a roll mill, in a melt extruder, or in internal mixers having convoluted rollers, sigma blades, etc, preferably using an extruder. For example, pellets of the base resin, trunk polymer and side chain polymer may be pre-blended to provide a salt-and-pepper blend of the three components and then melt blended in an extruder. During the extrusion, the trunk polymer and the side chain polymer can react to form the graft copolymer. Alternatively, the components may be fed from separate hoppers into the extruder to be blended and grafted.

The compositions used in this invention can additionally comprise optional materials commonly used and well known in the polymer art. Such materials include plasticizers, stabilizers including viscosity stabilizers and hydrolytic stabilizers, primary and secondary antioxidants, ultraviolet ray absorbers, anti-static agents, dyes, pigments or other coloring agents, inorganic fillers, fire-retardants, lubricants, reinforcing agents such as glass fiber and flakes, foaming or blowing agents, processing aids, slip additives, antiblock agents such as silica or talc, release agents, tackifying resins and/or mixtures thereof. Some suitable additives are described in the Kirk Othmer *Encyclopedia of Chemical Technology*, for example.

If present, the optional additives described above may be present in the compositions of this invention in quantities of from about 0.01 to 25 weight %, or from 0.01 to 15 weight %, or from 0.01 to 10 weight %, or from 0.01 to 5 weight %, so long as they do not detract from the basic and novel characteristics of the composition and do not have a significant adverse effect the performance properties, such as the antistatic performance and adhesive properties, of the composition in the amounts used. For the avoidance of doubt, the weight percentages provided for the compositions described herein for the combination of (a), (b) and (c) or (a) and (d) do not include the presence of optional components, unless otherwise stipulated.

Of note are compositions that do not comprise or include low weight-average molecular weight copolyester such as described in WO2002/102898 and US2003/0021945. Inclusion of such copolyesters may unacceptably reduce the clarity of articles prepared from the composition.

The components used in the compositions can be dry blended and subsequently melt blended in a twin-screw extruder and repelletized as known in the art. For example, the blends can be prepared by melt mixing the components in a 30-mm twin-screw extruder, using a melt temperature of from 180° C. to 230° C.

Melt-blended resins of this invention can be converted by a variety of techniques and processes known to one of ordinary skill in the art. The compositions of the invention can be used in monolayer or multilayer structures to impart their antistatic properties. A laminate of the invention can have at least two layers, including a layer of the antistatic blend. The compositions of this invention are useful in packaging applications such as films, containers, and lids.

For example, the composition can be converted into a film or sheet by cast or blown film die extrusion techniques.

The composition can be coextruded with other thermoplastic polymers to provide a multilayer structure. For example, polyethylene homopolymers, polyethylene copolymers, polypropylene homopolymers or polypropylene copolymers; or ethylene copolymer comprising copolymerized units of ethylene and copolymerized units of a polar comonomer selected from vinyl acetate, alkyl methacrylate, alkyl acrylate, carbon monoxide or mixtures thereof may comprise an additional layer. A coextruded film can be created incorporating polar barrier resins such as polyamides, ethylene vinyl alcohol copolymer (EVOH) or polyester such as polyethylene terephthalate, polytrimethylene terephthalate, polytetramethylene terephthalate, polyethylene naphthalate, cyclohexanedimethanol-copolymerized polyethylene terephthalate, or polyester elastomers.

In other applications a composition as described herein can be directly coated onto a substrate by processes well known in the art, including, for example, extrusion lamination, extrusion coating, coextrusion lamination and coextrusion coating. These techniques involve laying down a molten curtain of the polymer onto the substrate, or between substrates moving at high speeds as they come into contact with a cold roll.

The amounts and types of the components of the antistatic composition can be adjusted to provide desired adhesion to the other layers of a multilayer structure. For example, the base resin of antistatic composition may comprise a large amount of nonpolar polyethylene or polypropylene and little or no optional polar copolymer if the antistatic composition is to be adhered to another layer comprising nonpolar materials. Conversely, the base resin may include larger amounts of polar ethylene copolymers if the antistatic composition is to be adhered to another layer comprising more polar materials.

The antistatic compositions of this invention can be useful as an intermediate layer of a multilayer laminate. The composition comprises an intermediate, interior or "hidden" layer of a multilayer laminate, including at least one surface layer and an intermediate layer, in which the intermediate layer is comprised of the antistatic composition described above.

A laminate of this invention can comprise a surface layer comprising polymeric material(s) having a surface resistivity of $1 \times 10^{14} \Omega$ or more and wherein at least one of the surface layers has a 10% decay time not more than 20 seconds at an applied voltage of +5000 V, the 10% decay time being measured at 23° C. under an atmosphere of 50% or 60% relative humidity.

A polymeric material having a surface resistivity of $1 \times 10^{14} \Omega$ or more (measured at 23° C. under an atmosphere of 50% relative humidity) can be used for a surface layer. This polymeric material is such that a molded article made only of the material exhibits a surface resistivity of $1 \times 10^{14} \Omega$ or more. Specific examples thereof include homopolymers of ethylene; copolymers of ethylene and an α-olefin having from 3 to 12 carbon atoms, e.g., high pressure process polyethylene, medium or high density polyethylene, linear low density polyethylene, especially linear low density polyethylene having a density of 940 kg/m³ or less and very low density polyethylene; polypropylene; poly-1-butene; poly-4-methyl-1-pentene; copolymers of ethylene and a polar monomer, for example, an ethylene-vinyl acetate copolymer, copolymers of ethylene and unsaturated carboxylic acid, e.g., acrylic acid, methacrylic acid, monoethyl maleate, maleic anhydride, etc. or their ionomers of Na, Li, K, Zn, Mg, Ca or the like; copolymers of ethylene and at least one kind of unsaturated carboxylic acid ester, for example, methyl acrylate, ethyl acrylate, isobutyl acrylate, n-butyl acrylate, 2-ethylhexyl acrylate, methyl methacrylate, glycidyl methacrylate, dimethyl maleate; copolymers of ethylene and an unsaturated carboxylic acid and unsaturated carboxylic acid ester such as those mentioned previously, or ionomers comprising cations selected from the group consisting of: Na; Li; K; Zn; Mg; Ca and the like; copolymers of ethylene, carbon monoxide and, optionally, an unsaturated carboxylic acid ester or vinyl acetate; olefin-based polymers such as polyolefin elastomers; styrene-based polymers such as rubber-reinforced styrene-based resins, for example, polystyrene, high impact polystyrene, ABS resin, etc.; polyesters such as polyethylene terephthalate, polytrimethylene terephthalate, polytetramethylene terephthalate, polyethylene naphthalate, cyclohexanedimethanol-copolymerized polyethylene terephthalate, and polyester elastomers; polycarbonates; polymethyl methacrylate; or mixtures of two or more of them.

Of such polymeric materials, use of a polymeric material selected from ionomers, especially zinc ionomers, or ethylene-based polymers, such as polyethylene, including those produced with a metallocene catalyst, or ethylene copolymers with polar comonomers described above, are preferred because a laminate having excellent antifouling properties can be obtained easily when surface layers comprising these polymers are combined with an intermediate layer comprising the antistatic composition of this invention. These surface layer compositions are easily heat sealable.

The zinc ionomer is one obtained by neutralizing partially with zinc an ethylene-unsaturated carboxylic acid copolymer that may optionally be copolymerized with another polar monomer. One in which other metal ions are present is also suitable.

Examples of the unsaturated carboxylic acid include acrylic acid, methacrylic acid. Examples of polar monomers that can serve as copolymerization components include vinyl esters such as vinyl acetate and vinyl propionate; unsaturated carboxylic acid esters such as methyl acrylate, ethyl acrylate, isopropyl acrylate, n-butyl acrylate, isobutyl acrylate, n-hexyl acrylate, isooctyl acrylate, methyl methacrylate. In particular, unsaturated carboxylic acid esters are suitable copolymerization components.

As the ethylene-unsaturated carboxylic acid copolymer as the base polymer of the zinc ionomer, preferred are those having an unsaturated carboxylic acid content of about 1 to about 25% by weight, especially about 5 to about 20% by weight. The content of the polar monomer that can be copolymerized is, for example, about 40% by weight or less, preferably about 30% or less. The zinc ionomer preferably has a degree of neutralization of about 10 to about 90%, particularly about 15 to about 80%. When processability and practical physical properties are taken into consideration, preferred is the use of an ionomer having a melt flow rate, measured at 190° C. and 2160 g load, of about 0.1 to about 100 g/10 minutes, preferably about 0.2 to about 50 g/10 minutes.

A structure where another polymeric material layer or an adhesive layer is formed between at least one of the surface layers and the intermediate layer is contemplated herein. Although such a polymeric material layer may be a layer made of a polymeric material mentioned as the surface layer, it may be a recovery layer in which recovered wastes such as off-specification products or selvages formed during the production of laminates are used. The material of such a recovery layer can be the same as the material of the surface layer, the intermediate layer or a mixture of these materials.

The adhesive layer that can be formed between a surface layer and an intermediate layer can be any that is capable of improving the adhesion between the surface layer and the intermediate layer. It can be selected from thermoplastic polymers such as those listed as the examples of the material of the surface layers and also may be a hot melt adhesive or application-type adhesives. It may be preferable to use an adhesive capable of being extrusion coated or coextruded selected from thermoplastic polymers and compositions comprising such thermoplastic polymers and tackifiers or the like incorporated thereto.

Anhydride or acid modified ethylene and propylene homo- and co-polymers are used as extrudable adhesive layers (also known as "tie" layers) to improve bonding of layers of polymers together when the polymers do not adhere well to each other, thus improving the layer-to-layer adhesion in a multilayer structure. The compositions of the tie layers will be determined according to the compositions of the adjoining layers that need to be bonded in a multilayer structure. Various tie layer compositions are commercially available under the tradename Bynel® from DuPont.

Another preferred embodiment in this invention is a laminate structure comprising a three-layer structure of a first surface layer (outer layer)/an intermediate layer/a second surface layer (inner layer) wherein the first and second surface layers are made of a polyethylene such as a low, medium or high density polyethylene or an ethylene-unsaturated ester copolymer such as an ethylene-vinyl acetate copolymer and the intermediate layer is made of the antistatic composition of this invention.

The laminate of this invention can be manufactured by laminating individual layers, preferably by extrusion coating, coextrusion or blow molding. Although the thickness of the whole laminate is arbitrary and dependent on its application, it is preferably from about 10 to about 3000 µm, and in particular, from about 20 to about 1000 µm, for example. In another embodiment of this invention, at least one surface layer has a 10% decay time (a time required until the potential decays to +500 V from an applied voltage of +5000 V) of 20 seconds or less, preferably 10 seconds or less, and more preferably 1 second or less, the 10% decay time being measured at 23° C. under an atmosphere of 50% relative humidity. For this purpose, it is preferable that the intermediate layer has a thickness of 5 µm or more, preferably of 10 µm or more, and that the thickness of the surface layer with the decay characteristic indicated above is 500 µm or less, especially 300 µm or less, in terms of the thickness of the surface layer or, if a recovery layer or an adhesive layer is formed, in terms of the total thickness of the surface layer and the additional layer(s). Moreover, when a practical performance is taken into consideration, the ratio of the thickness of the surface layer (or, when a recovery layer or an adhesive layer is formed), the total thickness of the surface layer and the additional layer(s) to the thickness of the intermediate layer is preferably from about 0.1 to about 100 µm, and more preferably from about 0.5 to about 50 µm.

Individual layers can incorporate various additives as needed, examples of which include antioxidants, light stabilizers, ultraviolet absorbers, pigments, dyes, lubricants, antiblocking agents, inorganic fillers, foaming agents, etc. For example, it is possible to incorporate an organic or inorganic chemical foaming agent such as azodicarbonamide, dinitrosopentamethylenediamine, sulfonylhydrazide, sodium bicarbonate and ammonium bicarbonate at a ratio of from about 0.1 to about 10 parts by weight per 100 parts by weight of the polymer component constituting a layer.

A laminate film of the invention can be prepared by coextrusion as follows: granulates of the various components are melted in suitable extruders and converted into a film using a converting technique. For coextrusion, the molten polymers are passed through a die or set of dies to form layers of molten polymers that are processed as a laminar flow and then cooled to form a layered structure. The laminate of this invention may also be made by coextrusion followed by lamination onto one or more other layers. Suitable converting techniques include blown film extrusion, cast film extrusion, cast sheet extrusion and extrusion coating.

The laminate of this invention can be used for various applications such as base materials of dicing tapes; adhesive tapes or films for semiconductors such as backgrinding films; electric and electronic materials such as marking films, integrated circuit carrier tapes and tapes for taping electronic components; materials for wrapping foods; medical supplies; protection films (e.g., guard films or sheets for boards and lenses of glass, plastics or metal); steel-wire covering materials; cleanroom curtains; wallpapers; mats; flooring materials; inner bags of flexible containers; containers; shoes; battery separators; antifouling films; dustproofing films; PVC-free films; tubes, bottles and the like for packaging cosmetics, detergents, shampoo, rinse, etc.

According to this invention, laminates that are excellent in charge decay property and capable of preventing dusts and powders from adhering thereto due to charging are excellent in antifouling properties. Such laminates can be used in the form of a film, a tape, a sheet, a tube, a pipe, a bag, a multilayer container (for example, a container made by blow molding), a rod, various injection-molded articles, various blow-molded articles, etc. Preferred is a laminate in the form of a film, a sheet, a bag or a multilayer container. In such cases, a molded article having a surface layer with the decay characteristic, the surface layer forming an outer surface of the article, is excellent in antifouling property and can avoid soiling of the surface. Further, when the laminate is used as a wrapping material of a powder where it is used in such a manner that the surface layer with the decay characteristic is an inner surface layer, no powder electrostatically adheres to the wrapping material and, therefore, their commodity value is not deteriorated.

As indicated above, another aspect of this invention is a multilayer blown container comprising a laminate of this invention having as its intermediate layer a layer comprising the composition of this invention. Of note is a lamination structure comprising a three-layer structure of a first surface layer (outer layer)/an intermediate layer/a second surface layer (inner layer) wherein the first and second surface layers are made of a polyethylene such as a low, medium or high density polyethylene or an ethylene-unsaturated ester copolymer such as an ethylene-vinyl acetate copolymer and the intermediate layer is made of a composition of this invention. A multilayer blown container comprising a laminate of this constitution has an outer surface excellent in slipping property, scratch resistance and antifouling property.

EXAMPLES

Without further elaboration, it is believed that one skilled in the art using the preceding description can utilize this invention to its fullest extent. The following Examples are, therefore, to be construed as merely illustrative, and not limiting of the disclosure in any way whatsoever. The methods for the evaluation of the raw materials used and the antistatic performances of the resulting laminates in the following Examples and Comparative Examples are shown below.

Materials Used

PEA-1: a monoamine-terminated polyether with a MW of 1000 and mole ratio between PO and EO of 3/19 obtained from Huntsman as Jeffamine® M-1000.

EMAME-1: a copolymer of 90.5 weight % ethylene and 9.5 weight % MAME, with MI of 30 as measured at 190° C.

EMAME-2: a copolymer of 85 weight % ethylene and 15 weight % MAME, with MI of 40 as measured at 190° C.

EVA-1: a copolymer of ethylene and 25 weight % of vinyl acetate, with MI of 2 as measured at 190° C.

EMA-1: a copolymer of ethylene and 20 weight % of methyl acrylate, with MI of 8 as measured at 190° C.

AOX-1: an antioxidant commercially available from CIBA-Geigy under the tradename Irganox® 1098.

AOX-2: an antioxidant commercially available from CIBA-Geigy under the tradename Irganox® 1010.

PP-1: polypropylene available from Dow Chemical Company under the designation DX5E98 (10 mil, 170° C. press molded film)

PE-1: linear low density polyethylene with MI of 4.8 g/10 min, (190° C., 2.16 kg) available from Nova Chemicals under the designation Sclair® 8107.

PE-2: low density polyethylene formerly commercially available from DuPont Performance Elastomers under the designation DPE1640.

LDPE: a low-density polyethylene, available from Alathon under the designation 1640.

The surface resistivity and volume resistivity tests were conducted in compliance with the ASTM D-257 method using the alternating polarity technique. A Keithley Electrometer 6517A and a resistivity test fixture 8009 were used for all of the measurements. The tests were conducted at 500 volts. The temperature and the humidity were controlled at 23° C. and 20% RH in an environmental chamber. The sample was allowed 24 hours to equilibrate prior to the measurements. The surface resistivity of the films was measured and reported in Table 2, as ohms/square. "NA" means a measurement was not obtained.

The materials summarized in Table 1 were melt compounded to provide graft copolymers containing polyetheramide segments. Preparative Examples P1-P4 were prepared by melt processing 3000 g of EMAME-1 containing 0.1 weight % of antioxidant AOX-1 with PEA-1 at the feed rate indicated in Table 1. Preparative Example P5 was prepared similarly, except that the EMAME was combined with EMA-1 for blending. This provided the graft copolymer in a blend with EMA-1. The reaction between EMAME and polyetheramine went well. There was an obvious melt flow reduction for the blends, an indication that the polyetheramine was incorporated onto the EMAME backbone. The resulting graft copolymers were analyzed to determine the amount of PEA that was incorporated into the graft copolymer.

TABLE 1

| Preparative Example | 3000 g + 0.1 weight % of AOX-1 EMAME-1/ EMA-1 ratio | weight % PEA-1 feed rate | weight % PEA-1 incorporated | MI (g/10 min) |
|---|---|---|---|---|
| P1 | 100 | 0 | 30 | 23.0 | 5.9 |
| P2 | 100 | 0 | 35 | 26.0 | 4.3 |
| P3 | 100 | 0 | 40 | 28.6 | 4.7 |
| P4 | 100 | 0 | 45 | 31.0 | 5.3 |
| P5 | 70 | 30 | 28 | 21.8 | 4.0 |

The antistatic materials in Table 1 were melt blended with HDPE-1 to provide the example compositions and blown films were prepared as summarized in Table 2. All samples were made into blown films easily. The films, approximately 1 to 3 mils in thickness, were made using a small laboratory scale blown film line.

The antistatic performance was measured and summarized in Table 2. The surface resistivity and volume resistivity tests were conducted in compliance with the ASTM D-257 method. Surface Resistivity (ohm/sq) was measured according to ASTM D-257 using the alternating polarity technique. The voltage was set at 500 volts. A Keithley Electrometer 6517A and a resistivity test fixture 8009 were used for all of the measurements. The tests were conducted at 500 volts. The temperature and the humidity were controlled at 23° C. and 20% RH (or specified RH %) in an environmental chamber. Each sample was allowed to equilibrate at least for 48 hours prior to the measurements.

TABLE 2

| | Example | | | | |
|---|---|---|---|---|---|
| | 1 | 2 | 3 | 4 | 5 |
| HDPE-1 (weight %) | 80 | 70 | 80 | 70 | 80 |
| Antistatic material | P1 | P2 | P3 | P4 | P5 |
| weight % | 20 | 30 | 20 | 30 | 20 |
| PEA in composition (weight %) | 4.6 | 7.8 | 5.7 | 9.3 | 4.3 |
| Blown film thickness (mm) | 0.027 | 0.046 | 0.039 | 0.043 | 0.049 |
| Surface resistivity (ohm/sq) | 2.60E+13 | 7.60E+12 | 1.20E+13 | 2.60E+12 | 9.40E+13 |
| Volume Resistivity (ohm-cm) | 1.30E+14 | 3.30E+12 | 2.70E+13 | 1.60E+12 | 1.30E+14 |

Example 6 summarized in Table 3 was prepared by melt blending the materials listed using a 30-mm diameter twin screw extruder with a mixing screw, using a melt temperature of from 180° C. to 230° C. The composition was converted to film or to samples appropriate for the tests listed above. A cast film was prepared using a slot die cast film line with a 28-mm diameter, 28:1 length to diameter ratio (L/D) twin screw extruder operating with ramped extruder zone temperatures of 160° C. to 180° C., and a 10-inch wide slot die operating at temperature of 180° C. to cast the melt-processable polymer onto a chilled 20° C. casting roll, forming a monolayer film.

TABLE 3

| Material | Parts by weight |
|---|---|
| EMAME-1 | 30 |
| LDPE | 70 |
| PEA-1 | 8 |
| Melt Index (g/10 min) | 2.8 |
| Cast film thickness (mm) | 0.37 |
| Antistatic Properties | |
| Surface resistivity (ohm/sq) | NA |
| Volume resistivity (ohm-cm) | 1.50E+13 |
| Adhesion to other polymers (lbf/in) | |
| PE-1 (10 mil, press molded film), 150 C/60 sec. | Could not pull apart |
| PE-2 (10 mil, press molded film), 150 C/60 sec. | 6.44 |
| PP-1 (10 mil, 170° C. press molded film) 90° C./30 sec. | NA |

The data in Table 3 demonstrate that Example 6, despite its high polarity component, still provided excellent adhesion to other, nonpolar substrates. This is important for end use applications, which in most cases are in multilayer structure form. It is important that the material of high polarity can be adhered to polymers of other layers either by coextrusion, lamination or extrusion coating. This invention provides blends that are able to adhere to polyolefin substrates despite their high polarity. Even with high polarity components, the blends still retain the chemical and physical nature of the polyethylene portions of the polymers.

Table 4 lists two additional blend examples. Example 7 is a blend of EMAME and EMA-1 (70/30 weight %) with 28 weight % of PEA-1. Antioxidant AOX-2, 0.1 weight %, was included. The sample was produced in a W/P extruder in one step. Example 8 is a blend of 40 weight % of LDPE and 60 weight % of a polyethyleneamine-grafted EMAME. The grafted component of Example 10 was prepared from 100 parts by weight of EMAME-2 and 40 parts by weight of PEA-1 and AOX-1, 0.1 weight %, prepared separately in a W/P extruder. The graft copolymer had a melting point of 100.7° C. In essence, Example 8 was prepared in two steps by first making the polyetheramine-grafted EMAME and then blending with LDPE.

Blown films were prepared from the materials listed in Table 4. The samples were made into blown films easily. The films, approximately 1 to 3 mils in thickness, were made using a small laboratory scale blown film line.

TABLE 4

| | Example | |
|---|---|---|
| | 6 | 7 |
| | Parts by weight | |
| EMAME-1 | 70 | 43 |
| EMAME-2 | | |
| EMA-1 | 30 | |
| LDPE | | 40 |
| PEA-1 | 28 | 17 |
| AOX-2 | 0.1 | |
| AOX-1 | | 0.06 |
| Melt Flow Index | 4.0 | 5.0 |
| DSC Melting point (° C.) | 102.5 | 108 |
| Blown Film Thickness (mil) | 2.0 | 2.2 |
| Adhesion to Tyvek ® House Wrap | excellent | NA |
| Surface Resistivity (ohm/sq) | 4.4E+11 | 3.27E+11 |

The blown films were sandwiched between Tyvek® HomeWrap and press molded at 120° C. A T-peel test was performed to determine whether the blown film adhered to the Tyvek®. In the sandwich samples, the Tyvek® was pulled apart into fuzz and threads, which suggested excellent adhesion of the blown film to Tyvek®.

The invention claimed is:

1. An antistatic composition comprising:
   (a) a base resin comprising or consisting essentially of
      i. 31 to 100 weight % based on the combination of i. and ii.; of polyethylene homopolymers, polyethylene copolymers, polypropylene homopolymers or polypropylene copolymers; and
      ii. 0 to 69 weight %, based on the combination of i. and ii., of at least one ethylene copolymer, said ethylene copolymer comprising copolymerized units of ethylene and copolymerized units of a polar comonomer selected from the group consisting of vinyl acetate, alkyl methacrylate, alkyl acrylate, carbon monoxide and mixtures thereof, wherein said copolymerized units of said polar comonomer are present in an amount of from about 6 to about 40 weight %, based on the total weight of the ethylene copolymer;
   (b) a copolymer comprising copolymerized units of ethylene and copolymerized units of a comonomer providing an amine-reactive site comprising an anhydride group, a vicinal pair of carboxylic groups or a carboxylic group adjacent to an alkoxycarbonyl group, wherein the alkoxy group contains up to 20 carbon atoms, and optionally copolymerized units of a third comonomer, wherein the comonomer providing the amine-reactive site is present in the copolymer in an amount of from 3 to 25 weight %, based on the total weight of the copolymer; and
   (c) a short chain polymer having from about 5 to 50 repeat units and containing one primary amine, the remainder of the short chain polymer being substantially unreactive with the amine-reactive sites of the copolymer, and said short chain polymer comprising copolymerized units of propylene oxide, ethylene oxide, or a mixture thereof;
   wherein the antistatic composition comprises about 20 to about 90 parts by weight of the base resin; about 10 to about 80 parts by weight of the copolymer; and about 3 to about 30 parts by weight of the short chain polymer, based on the combination of (a), (b) and (c).

2. The antistatic composition of claim 1 comprising a blend of (a) and (d) an ethylene graft copolymer comprising polyetherimide segments, wherein the ethylene graft copolymer comprises a trunk copolymer comprising copolymerized units of ethylene, copolymerized units of a comonomer providing an amine-reactive site comprising an anhydride group, a vicinal pair of carboxylic groups or a carboxylic group adjacent to an alkoxycarbonyl group, wherein the alkoxy group contains up to 20 carbon atoms, and optionally copolymerized units of a third comonomer; and at least one type side chain polymer linked to said reactive sites through imide linkages, said side chain polymer being derived from a short chain polymer having from about 5 to 50 repeat units and containing one primary amine active amine site, the remainder of the side chain polymer being substantially unreactive with the amine-reactive sites of the trunk copolymer and comprising propylene oxide, ethylene oxide, or mixture thereof.

3. An article of manufacture, film or powder comprising the antistatic composition of claim 1.

4. The film of claim 3 that is a multilayer film structure comprising at least one layer comprising the antistatic composition and at least one additional layer.

5. The multilayer film structure of claim 4 wherein the layer comprising the antistatic composition is a surface layer.

6. The multilayer film structure of claim 4 comprising at least one layer comprising a polar barrier resin.

7. The multilayer film structure of claim 4 wherein the polar barrier resin comprises polyamide, ethylene vinyl alcohol copolymer or polyester.

8. The multilayer film structure of claim 4 comprising at least one layer comprising polyethylene homopolymer, polyethylene copolymer, polypropylene homopolymer or polypropylene copolymer; or ethylene copolymer comprising copolymerized units of ethylene and copolymerized units of a polar comonomer selected from vinyl acetate, alkyl methacrylate, alkyl acrylate, carbon monoxide or mixture thereof.

9. The multilayer film structure of claim 4 wherein the layer comprising the antistatic composition is an intermediate layer.

10. The multilayer film structure of claim 4 wherein the surface layer comprises an ionomer or ethylene-based polymer.

11. The multilayer film structure of claim 10 wherein the ethylene-based polymer comprises polyethylene homopolymer, polyethylene copolymer, polypropylene homopolymer or polypropylene copolymer; or ethylene copolymer comprising copolymerized units of ethylene and copolymerized units of a polar comonomer selected from vinyl acetate, alkyl methacrylate, alkyl acrylate, carbon monoxide or mixture thereof.

12. A process for preparing the composition of claim 2, said process comprising the steps of:

(1) providing the base polymer resin;
(2) providing the copolymer;
(3) providing the short chain polymer
(4) heating and mixing the base resin, the copolymer and the short chain polymer for about 15 seconds to about 60 minutes, to provide a blend of the base resin and an ethylene graft copolymer comprising polyetherimide segments.

13. The process of claim 12, wherein the base resin, the copolymer and the short chain polymer are heated and melt-mixed at a temperature of from 180 to 230° C.

14. The process of claim 12, wherein the base resin, the copolymer and the short chain polymer are heated and mixed in solution at a temperature of 75 to 100° C. or higher.

15. The antistatic composition of claim 1 comprising an ethylene graft copolymer that is the reaction product of the amine-reactive sites of the copolymer and the primary amines of the short chain polymer.

16. An article of manufacture, film or powder comprising the antistatic composition of claim 15.

17. The film of claim 16 that is a multilayer film comprising at least one layer comprising the antistatic composition and at least one additional layer.

18. The multilayer film of claim 17, wherein a surface layer comprises the antistatic composition; or wherein an intermediate layer comprises the antistatic composition; or wherein at least one layer comprises a polar barrier resin; or wherein a surface layer comprises an ionomer or an ethylene-based polymer.

19. The multilayer film of claim 18, wherein the polar barrier resin comprises polyamide, ethylene vinyl alcohol copolymer or polyester.

20. The multilayer film of claim 17, wherein the at least one additional layer comprises polyethylene homopolymer, polyethylene copolymer, polypropylene homopolymer or polypropylene copolymer; or ethylene copolymer comprising copolymerized units of ethylene and copolymerized units of a polar comonomer selected from the group consisting of vinyl acetate, alkyl methacrylate, alkyl acrylate, carbon monoxide, and mixtures of two or more of vinyl acetate, alkyl methacrylate, alkyl acrylate, and carbon monoxide.

* * * * *